July 10, 1934.    M. H. KLIEFOTH    1,966,069
ACOUSTIC TILE AND METHOD OF MANUFACTURING THE SAME
Filed Oct. 26, 1932
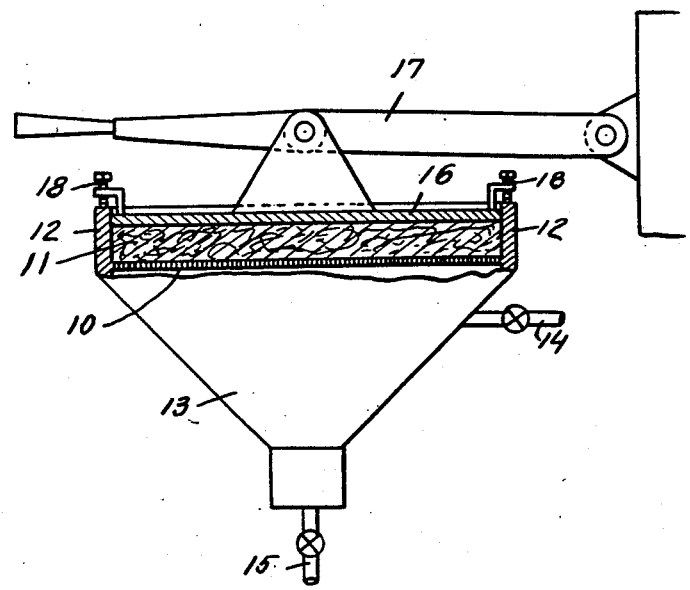
INVENTOR
Max H. Kliefoth
BY
Pennie, Davis, Marvin & Edmonds
ATTORNEYS Patented July 10, 1934

1,966,069

UNITED STATES PATENT OFFICE 1,966,069

ACOUSTIC TILE AND METHOD OF MANUFACTURING THE SAME

Max H. Kliefoth, Madison, Wis., assignor to C. F. Burgess Laboratories, Inc., a corporation of Delaware Application October 26, 1932, Serial No. 639,597

25 Claims. (Cl. 18—47.5)

This invention relates to a sound absorbing tile of the rigid type which has a high coefficient of absorption.

It is an object of this invention to provide an acoustic tile which combines a high coefficient of sound absorption together with structural rigidity so that it may be used without any supporting facing material when applied as by means of an adhesive to walls, ceilings and other surfaces. It is a further object to make, by new methods, such a tile of ceramic or other non-combustible materials having a type of surface which is decorative and pleasing to the eye.

Although many types of acoustical tiles and especially ceramic and other non-combustible types of acoustical tiles have been and are being made, these tiles have not been entirely satisfactory. Such tiles either are too fragile, or when sufficiently strong have too low a coefficient of absorption. Many also are not decorative and are not capable of being decorated.

The acoustic tiles which I have invented, and which are the subject matter of this application, are formed first by shaping a mixture of particles of a body material and a wet adhesive comprising sodium silicate. The shaped tiles are then dried. The intercommunicating pores or channels necessary to give such dried tiles the necessary property of absorbing sound are not formed by using a deficiency of adhesive in the wet mixture to leave interstices or openings between the body particles but are formed by the shrinkage of the adhesive and other moist materials during the operations which remove moisture from the wet shaped tile. It is due largely to this method of producing the porosity that I attribute the excellent qualities of the tile that I am able to produce by the methods which are to be hereinafter described. It is understood that the specific examples to be given and the proportions of the materials used are merely illustrative and the invention as expressed by the claims is not limited thereto.

The body material which may be used may be fibrous in character such as a mineral wool which may be rock wool, glass wool, slag wool, asbestos or the like. The body material also may be granular in character. Intermediate forms of body material may be used. The granular material may either be of organic or inorganic nature. It is preferably non-combustible. Granular cork and crushed coke are excellent organic granular materials. An inorganic granular material, preferably non-metallic, may either be a natural product such as crushed rock of various kinds or it may be an artificial or ceramic material such as baked and vitrified clay products. It also may be a specially made artificial or natural granular product or it may be a specially shaped product, as, for example, the hollow beads or tubes described in my copending application Serial No. 625,558, filed July 28, 1932. It usually is desirable to have the absorbing tile as light in weight as possible and therefore a porous or other light weight aggregate or granular material such as pumice stone, blown granular slag and water-floated slag is desirable and preferable.

The alkali silicate may be potassium silicate but it preferably is sodium silicate because of its lower cost. Sodium silicates having a ratio of $SiO_2$ to $Na_2O$ ranging from 2.85 to 1 and 3.25 to 1 are preferred but silicates of other ratios may be used. Mixtures of these may be used.

Method for making a fibrous tile

When the body material is a mineral wool it is first fanned and cleaned of any shot which may be present. This wool is added to a previously prepared slurry containing precipitated sodium silicate and a small amount of wood fiber. The wood fibers are prepared by beating wood pulp, preferably old newspaper stock, in water or by dry shredding it so as to avoid gelatinization during the beating operation, and then thoroughly mixing it with the water. To 5 parts of this shredded news stock in suspension in 250 parts of water is added 5 parts by weight of a 42° Bé. solution of 3.25 to 1 sodium silicate. Short-fibered asbestos may replace a portion of the wood fiber to decrease the shrinkage during drying. After a homogeneous suspension is obtained 2 parts of alum are added to precipitate the silicate. Any suitable acid or other salt may be used to precipitate the silicate. This slurry is then added to 235 parts of the cleaned mineral wool in a mixing container and thoroughly stirred. Too much working of the fragile mineral wool must be avoided or its fibrous character is destroyed. The mixture is thickened by draining off the excess water. This operation coats and stiffens (after drying) the individual fibers of mineral wool with a thin envelope of a gel of precipitated sodium silicate which probably is a silica gel. The wood or paper fibers in the gel reenforce the structure. This stiffening envelope may be omitted if desired but for best results it should be used.

The 200 parts of sodium silicate adhesive which are used to bind these coated or uncoated fibers together are then added to and mixed with this thickened slurry. A 47° Bé. 2.85 to 1 ratio sodium silicate preferably is used. This mixture is shaped into a tile and dried. The mixture is shaped by brush tamping it into a forming box as hereinafter described.

The first of the water removing operations whereby the wet constituents are dried and shrunk to form the intercommunicating pores or small channels is the removal of excess water without appreciably compressing and densifying the tile by applying both suction at the bottom of the formed slurry and light pressure at the top. The pressure and suction need not be applied simultaneously. The pressure may be applied either by means of a press arrangement or by air pressure, the mineral wool acting as a filter to retain most of the sodium silicate. It is possible to remove a much larger percentage of water when both suction and pressure are used without decreasing the size of the interstices produced by the removal of the water. The apparent density of the tile is thereby not increased as compared to the increase in apparent density when a similar amount of water is removed from the tile by compression alone. The evaporation costs for drying the tile also are decreased thereby. Because of the light pressure used this method produces a moist pad in which interstices of the required size remain between the fibers of mineral wool. The water previously in these interstices is largely removed in this first step. The removal of the excess water leaves moist alkali silicate to cement the fibers together and produces a moist pad which is light in weight and may be easily handled as compared to the heavy soggy mass, which is tender and difficult to handle should excess water remain in the interstices.

The tile is then dried in a drier such as an oven or it may be dried between steam platens. The drying should be at such a rate that no appreciable intumescence of the silicate results. Such intumescence may be more easily avoided and the permissible maximum drying temperature increased by incorporating an anti-migrating agent such as an alkali silicofluoride, preferably sodium silicofluoride, with the alkali silicate. The silicofluoride decreases greatly the migration of the silicate to the surface of the tile during drying to strengthen the structure greatly. It also increases appreciably its water resistance after drying. The anti-migrating agent is incorporated with the alkali silicate just prior to its addition to the slurry of mineral wool so that appreciable gelling of the silicate is avoided. About 16 parts of sodium silicofluoride added to the 200 parts of sodium silicate gives excellent results. From 12 to 20 parts may be used. It is preferably added to the silicate in powder form. Smaller amounts are not effective enough and larger amounts gel the silicate sufficiently to interfere with its adhesive properties. A high speed mixer may be used for this purpose. With this proportion of silicofluoride, the tiles may be dried at about 300° F. without appreciable intumescence of the silicate. A tile 1⅛ inches thick dries in about 7 hours at 300° F.

When the above procedure is followed the shrinkage of the tile during drying is very small, usually being about 5% or less. This small shrinkage helps to produce a high porosity. The water resistance of the sodium silicate may be increased still further by incorporating also about 2 parts of borax at the same time that the silicofluoride is incorporated therewith. These two chemicals act independently on the sodium silicate so that the borax may be used without the silicofluoride. The waterproofing of alkali silicates by means of borax is the subject matter of my copending application Serial No. 574,457 filed November 11, 1931.

The tile may be made more resilient and flexible by incorporating a small amount, 4 to 10 parts, of latex with 200 parts of sodium silicate adhesive, as described and claimed in my copending application Serial No. 652,696, filed January 20, 1933. It is preferably incorporated in conjunction with the alkali silicofluoride to keep it highly dispersed throughout the alkali silicate as described and claimed in my copending application Serial No. 652,695, filed January 20, 1933. The properties of the alkali silicate may be modified further by the addition of small amounts of gums and like materials.

During the drying operation a small amount of adhesive draws to the surfaces of the tile forming rather dense top and bottom surfaces. One of these dense surfaces is removed as by sanding to expose the porous sound absorbing interior structure. This sanded surface is exposed to the sound when the tile is mounted. The other dense surface is preferably not removed so that the "breathing" of the tile (passage of air through the tile) is cut to a minimum.

The tile made as described consists of mineral wool fibers thinly coated and stiffened with a thin hardened precipitated sodium silicate or gel reenforced with pulp fibers, though these may be omitted if desired. These stiffened fibers are knitted together by the binder comprising dried sodium silicate or a binder formed by the drying of a wet adhesive comprising a mixture of alkali silicate and other materials. This adhesive and the other wet materials shrink during the water removing or drying operations to form the necessary intercommunicating interstices and pores to give the desired sound absorption.

In the ordinary process of making an acoustic tile in which the particles of aggregate are thinly coated with viscous alkali silicate and then formed into a tile and dried, the silicate dries to a thin glossy coating on each particle. The binder or coating thus formed when viewed under the microscope appears to be smooth and continuous. However, the silicate binder of this invention formed by the method hereinbefore described when examined under the microscope has an entirely different appearance. It appears to consist of small discontinuous areas of alkali silicate on each particle, the crevices between adjacent areas usually extending to the surface of the particle which is coated. The areas are often jagged in appearance. The trying process appears to be analogous to the drying of mud whereby shrinkage cracks are formed.

The resulting tile is stiff and sufficiently hard so that it may be handled with but ordinary care without danger of breaking. It may be glued to surfaces without danger of splitting under its own weight and where the silicofluoride and/or borax are used the silicate is waterproofed sufficiently for practically all conditions of use. It is strong enough so that it may be surfaced with the stone-like ceramic material hereinafter described without splitting and warping under conditions of use. On the other hand, if the tile is made by mixing a thick adhesive, such as an alkali silicate, with mineral wool and then dried without intumescence in a mold the tendency is to form a solid block which does not have the necessary porosity to be of value for acoustical purposes. If the amount of adhesive is decreased, as by thinning out the alkali silicate with water, so as to prevent the formation of a solid block, the resulting pad is flimsy and possesses little strength.

The alkali silicate alone, when heated in the drying operation, especially in conjunction with the wick action of the mineral wool, has the property of migrating to the hot surfaces and forming a hard impervious crust, and thereby leave the interior practically free of adhesive. The interior portion is therefore without any strength. As previously described, this migration or flowing of the alkali silicate when heated may be prevented by incorporating an anti-migrating or setting agent.

A filler, which preferably is of small particle size such as kieselguhr or marble dust, may be incorporated with the alkali silicate adhesive. This filler tends to increase the strength of the silicate adhesive when dry and also increase its water resistance but it also increases the weight of the tile. The weight of the finished tile depends upon the materials used and the amount of pressure used in removing excess water previous to drying. As an example, mineral wool tiles with a high sound absorbing coefficient, made according to the above described methods, may have a weight of about 26 lbs. per cu. ft. and may have about 70% of voids.

One type of a combined suction and pressure box or mold for forming the tile is shown diagrammatically in Fig. 1. It consists of a perforated or porous bottom plate 10 on which the wet slurry 11 is thrown. The sides 12 of the box retain the slurry and form the sides of the mold. The hopper bottom 13 of the box has a pipe connection 14 to a vacuum pump (not shown) which is used to maintain a suction on bottom plate 10 for removing the excess water from slurry 11. A drain 15 allows the water to be removed from the hopper bottom 13. A plate or plunger 16 fits within the sides 12 of the mold and is used to apply light pressure to the top of the slurry 11. It is actuated by means of arm and lever arrangement 17. Stops 18 are provided to regulate the thickness of the wet, formed tile.

Experience teaches how much slurry must be introduced into the mold and how much pressure to apply to the slurry for making a tile of predetermined density and stiffness, the stiffness or rigidity depending in part on the density. If the light pressure alone is applied to the moist slurry the resultant shaped wet tile has a high water content. A high pressure reduces the water content but it also increases the density of the tile by decreasing the size of the interstices between the fibers. By applying suction with light pressure the water content is greatly reduced compared to that of a tile produced by pressure alone. This greatly reduces the drying time and costs. Furthermore the wet tile is much more easily handled when the water content is reduced.

It is obvious to those skilled in the art that with a slight change in the apparatus the pressure may be applied with air instead of by the plate 16. It is also possible to make use of a continuous machine by depositing the slurry on a traveling foraminous belt which passes over a suction box as the upper surface is subjected to pressure by rolls or caterpillar treads. It is also obvious that this method may be applied to the removal of liquids from porous fibrous articles other than acoustic absorbers.

*Method for making granular aggregate tile*

The body material for the granular aggregate tile which is stone-like in appearance and feel and which may be used as a facing for the mineral wool tile previously described, is preferably a light-weight aggregate such as pumice-stone. This is ground and screened to within the desired screen sizes depending upon the desired porosity and other characteristics of the tile. An aggregate passing through a 20 mesh screen and retained on a 40 mesh screen is excellent for absorbing tiles used under ordinary conditions. If decorative effects are desired vari-colored aggregates, mica or exfoliated vermiculite of slightly larger screen size, may replace a portion of the pumice stone. Various combinations of colored aggregates may be made as will be apparent to those skilled in the art.

To the above pumice stone aggregate a moist adhesive comprising an alkali silicate is added and thoroughly mixed therewith. For 65 parts by weight of the pumice stone about 45 parts of a viscous sodium silicate may be used. A 2.85 $SiO_2$:1 $Na_2O$ ratio sodium silicate of 47° Bé. is suitable though silicates of other ratios may be used. This amount of silicate should fill substantially all of the interstices between the aggregate particles. I prefer, however, to add to the silicate about 2 parts of an anti-migrating agent such as sodium silicofluoride which minimizes the migration of silicate to the surface of the tile when heated while being dried. As previously noted, this silicofluoride also minimizes the intumescence of the silicate at moderate drying temperatures and increases its water resistance.

A small amount of powdered filler in the silicate also increases its water resistance. Marble dust and fine kieselguhr are preferred. 8 parts of the marble dust with or without 3 parts of kieselguhr added to the above amounts of aggregate and silicate give excellent results. It may be necessary to add an additional 2 or 3 parts of water with these filler additions. If necessary to further increase the water resistance of the silicate 2 parts of borax may be added.

A small amount of latex, 1 to 3 parts, may be added to the silicate especially in the presence of the silicofluoride, to thereby increase the resilience and flexibility of the tile. Gums and like materials also may be incorporated with the alkali silicate in small amounts to further modify its properties.

The wet mixture of materials is pressed into a suitable form to shape the tile. The wet tiles are then dried in an oven or between steam heated plates. If an anti-migrating agent is used in the mixture a temperature of 300° F. is suitable and substantially no intumescence occurs. Without this agent the temperature used must be much lower so as to dry the silicate without intumescence. The tile is kept under heat until dry. The adhesive shrinks because of the removal of the water during the drying operation so that the intercommunicating interstices between the aggregate particles are again opened up, the adhesive shrinking onto and coating the aggregate particles. One or both of the exterior surfaces are then ground off to remove the more or less dense impervious surface formed during the manufacturing operations. This exposes the porous interior. Usually only one of the surfaces is ground off, the other remaining as a dense backing surface which prevents "breathing" of the tile. A paper or sheet asbestos backing may be baked onto the tile during the manufacturing operations so as to make an impervious back.

Throughout the specification and claims the term "mineral wool" is used in the generic sense and includes various types of non-metallic, inorganic, fibrous materials, both natural and artificial, such as asbestos, rock wool, slag wool, glass wool, mineral wool, etc. The properties of these various wools differ somewhat and the manufacturing procedure and proportions of ingredients must be varied somewhat with the different raw materials.

It also is possible to vary the proportions of ingredients from those given for the same type of mineral wool. As an example the sodium silicate may be a 42½° Bé. 3.25 $SiO_2$:1 $Na_2O$ ratio solution instead of the 47° Bé. 2.85 $SiO_2$:1 $Na_2O$ ratio solution. The amount of filler used may be varied. The amount of anti-migrating agent may be varied. Some of the mineral wools and aggregates are sufficiently alkaline with lime or other bases so that these act as anti-migrating agents to thereby cut down slightly the amount which it is necessary to add to the alkali silicate. Throughout the claims "drying" refers not only to the drying action by heat or evaporation alone but includes the dewatering effect obtained by draining and otherwise dewatering methods.

If it is advisable to combine absorbers of varying acoustical properties in one structure the tiles or acoustic absorbers of my invention may consist of strata or layers in which the sizes of interistics vary. The acoustical properties of such a composite absorber may be more easily controlled by making it of two or more layers, each layer having pores or interstices of different sizes so that each of such layers has its own acoustical properties which differ to some extent from those of the other layers. One layer may have a fibrous body material and the other may have a granular body material. The thickness of each layer with respect to the other layer or layers is determined by the acoustical properties desired for the composite finished absorber. The composite absorber preferably is built up while the body materials are in the wet state after which the composite wet absorber is subjected to the dewatering or drying operations previously described. The variation in the size of the interstices of the strata is most easily obtained by changes in the particle sizes and shapes of the body material.

If the composite absorber referred to above is composed of layers, one of which has a fibrous body material and the other of which has a granular body material, it usually is desirable to make the granular material the exposed facing because of its advantageous properties for that purpose. The base of fibrous body material, if made in accordance with my improved method as hereinbefore described, is strong enough to support such a facing without disintegrating or pulling apart under the conditions of use. Such a composite tile may be made by making the fibrous base and granular facing separately and then gluing them together but it is made preferably by facing the fibrous base with the granular facing before drying, the two being formed from their respective wet mixes into a unitary structure, and then drying the combined wet layers to form the combination tile. Care must be taken when making such composite tile that the channels or pores in both the base and facing are continuous from one into the other.

I claim:

1. An acoustic absorber comprising particles of a body material and an alkali silicate binder and containing a multiplicity of intercommunicating pores or channels therethrough formed by the shrinkage of said binder by the drying thereof, said dried binder comprising a dried alkali silicate characterized by a multiplicity of discontinuous small areas thereof and by a multiplicity of shrinkage cracks.

2. The acoustic absorber of claim 1 in which the silicate binder has an anti-migrating agent incorporated therewith.

3. The acoustic absorber of claim 1 in which the silicate binder comprises the reaction product of sodium silicate and an alkali silicofluoride.

4. The acoustic absorber of claim 1 in which the body material is fire-resisting and in which the silicate binder comprises the reaction product of sodium silicate, sodium silicofluoride and borax.

5. The method of making an acoustic absorber comprising particles of a body material and a binder and containing a multiplicity of intercommunicating pores or channels therethrough, which comprises mixing particles of a body material with a wet adhesive comprising alkali silicate in an amount that substantially fills the interstices between said particles of body material, said adhesive being of such composition that on drying it shrinks sufficiently to leave a multiplicity of intercommunicating pores or channels between said particles shaping said mixture, and removing water from said shaped mixture until dry substantially without intumescence of said silicate to shrink wet constituents of said shaped mixture to form said intercommunicating pores or channels.

6. The method of making an acoustic absorber comprising particles of a body material and a binder and containing a multiplicity of intercommunicating pores or channels therethrough, which comprises mixing an anti-migrating agent with a wet adhesive comprising alkali silicate, and mixing particles of a body material with an amount of said wet adhesive that substantially fills the interstices between said particles of body material, said adhesive being of such composition that on drying it shrinks sufficiently to leave a multiplicity of intercommunicating pores or channels between said particles shaping said mixture, and removing water from said shaped mixture until dry substantially without intumescence of said silicate to shrink wet constituents of said shaped mixture to form said intercommunicating pores or channels.

7. An acoustic tile comprising sized particles of a non-combustible aggregate and an alkali silicate binder and containing a multiplicity of intercommunicating pores or channels therethrough formed by the shrinkage of said binder by the drying thereof, said dried binder comprising a dried alkali silicate characterized by a multiplicity of discontinuous small areas thereof and by a multiplicity of shrinkage cracks.

8. The acoustic tile of claim 7 in which the non-combustible aggregate is porous and in which the silicate binder comprises the mixture of a filler with the reaction product of an alkali silicate and a water-proofing agent.

9. The acoustic tile of claim 7 in which the aggregate is pumice stone and in which the silicate binder comprises the reaction product of sodium silicate and sodium silicofluoride.

10. An acoustic absorber comprising fibrous material and an alkali silicate binder and containing a multiplicity of intercommunicating pores or channels therethrough formed by the shrinkage of said binder by the drying thereof, said dried binder being distributed throughout said fibrous material and enveloping individual fibers thereof and comprising a dried alkali silicate, characterized by a multiplicity of discontinuous small areas thereof and by a multiplicity of shrinkage cracks.

11. The acoustic absorber of claim 10 in which the fibrous material is mineral wool and in which the alkali silicate has an anti-migrating agent incorporated therewith.

12. An acoustic tile comprising mineral wool and an alkali silicate binder and containing a multiplicity of intercommunicating pores or channels therethrough formed by the shrinkage of said binder by the drying thereof, the fibers of said mineral wool having a stiffening envelope comprising dried gelled alkali silicate, said dried alkali silicate binder being characterized by a multiplicity of discontinuous small areas thereof and by a multiplicity of shrinkage cracks.

13. The acoustic tile of claim 12 in which the gelled alkali silicate stiffening envelope for the mineral wool fibers contains paper pulp and in which the binder comprises the reaction product of sodium silicate and alkali silicofluoride.

14. The acoustic tile of claim 12 in which the gelled alkali silicate stiffening envelope for the mineral wool fibers contains a reinforcing agent and in which the binder comprises alkali silicate having an anti-migrating agent incorporated therewith.

15. The acoustic tile of claim 12 in which the gelled alkali silicate stiffening envelope for the mineral wool fibers contains paper pulp and in which the binder comprises alkali silicate having an anti-migrating agent incorporated therewith.

16. An acoustic tile comprising a base of fibrous material and an alkali silicate binder and an adherent facing on said base comprising sized particles of an aggregate and a silicate binder, both base and facing containing a multiplicity of intercommunicating pores or channels therethrough formed by the shrinkage of said binder by the drying thereof, said dried binder being distributed throughout said fibrous material and enveloping individual fibers thereof, said binder for both the base and facing comprising a dried alkali silicate characterized by a multiplicity of discontinuous small areas thereof and by a multiplicity of shrinkage cracks.

17. The method of making an acoustic absorber comprising a fibrous material and a binder and containing a multiplicity of intercommunicating pores or channels therethrough which comprises mixing an anti-migrating agent with an alkali silicate to form an adhesive, mixing said fibrous material with said wet adhesive to form a thick slurry, said adhesive being of such composition that on drying it shrinks sufficiently to leave a multiplicity of intercommunicating pores or channels between fibers of said fibrous material shaping said slurry, and removing water from said shaped mixture until dry substantially without intumescence of said silicate to shrink said wet constituents of said shaped slurry to form said intercommunicating pores or channels.

18. The method of making an acoustic tile comprising a mineral wool and a binder and containing a multiplicity of intercommunicating pores or channels therethrough which comprises mixing an alkali silicofluoride with sodium silicate to form a wet adhesive, mixing said mineral wool with said wet adhesive to form a thick slurry, said adhesive being of such composition that on drying it shrinks sufficiently to leave a multiplicity of intercommunicating pores or channels between fibers of said fibrous material shaping said slurry and removing water from said shaped slurry until dry to shrink said wet constituents of said shaped slurry to form said intercommunicating pores or channels.

19. The method of making an acoustic tile comprising a mineral wool and a binder and containing a multiplicity of intercommunicating pores or channels therethrough which comprises making a slurry of precipitated alkali silicate, and mixing said mineral wool therewith, making an adhesive mixture comprising sodium silicate, mixing said adhesive mixture with said slurry to form a thick slurry, said adhesive being of such composition that on drying it shrinks sufficiently to leave a multiplicity of intercommunicating pores or channels between fibres of said fibrous material shaping said thick slurry and removing water from said shaped thick slurry until dry to shrink said combination of wet materials added to said mineral wool to form said intercommunicating pores and channels.

20. The method of making an acoustic tile comprising a mineral wool and a binder and containing a multiplicity of intercommunicating pores or channels therethrough, which comprises making a slurry of precipitated sodium silicate and paper pulp and mixing said mineral wool therewith, mixing alkali silicofluoride with sodium silicate to form an adhesive mixture, mixing said adhesive mixture with said slurry to form a thick slurry, said adhesive being of such composition that on drying it shrinks sufficiently to leave a multiplicity of intercommunicating pores or channels between fibers of said fibrous material shaping said thick slurry and removing water from said shaped thick slurry until dry to shrink said combination of wet materials added to said mineral wool to form said intercommunicating pores and channels.

21. The method of making an acoustic absorber comprising a fibrous material and a binder and containing a multiplicity of intercommunicating pores or channels therethrough which comprises mixing said fibrous material with a wet adhesive comprising an alkali silicate to form a thick slurry, said adhesive being of such composition that on drying it shrinks sufficiently to leave a multiplicity of intercommunicating pores or channels between fibers of said fibrous material brush tamping said slurry into shape, and removing water from said shaped mixture until dry substantially without intumescence of said silicate to shrink said wet constituents of said shaped slurry to form said intercommunicating pores or channels.

22. The method of making an acoustical absorber comprising an inorganic fibrous material and a binder and containing a multiplicity of intercommunicating pores or channels therethrough which comprises mixing an anti-migrating agent with alkali silicate to form a wet adhesive, mixing said fibrous material with said wet adhesive to form a thick slurry, said adhesive being of such composition that on drying it shrinks sufficiently to leave a multiplicity of intercommunicating pores or channels between fibers of said fibrous material shaping said thick slurry, and removing water from said shaped thick slurry until dry by first subjecting said shaped thick slurry to light pressure and suction and then subjecting it to an elevated temperature, the temperature being low enough to prevent any substantial intumescence of said adhesive.

23. As a step in the method of making a porous pad comprising a fibrous material and a binder, the method which comprises removing the excess liquid contained therein during the manufacture thereof from a shaped slurry of said fibrous material and a wet adhesive by applying both suction and light pressure on opposite surfaces of said shaped slurry, said pressure being sufficiently light so that it does not appreciably collapse the fibrous framework about the interstices resulting from the removal of the excess liquid from said shaped slurry.

24. The combination of steps in the method of making a porous pad comprising a mineral wool and a binder which comprises making a slurry of said mineral wool and a wet adhesive, forming a pad of said slurry, and applying both suction and light pressure on opposite surfaces of said slurry, said pressure being sufficiently light so that it does not appreciably collapse the fibrous framework about the interstices resulting from the removal of the excess liquid from said shaped slurry.

25. In the manufacture of a porous product comprising a mineral wool and a binder, the method for removing water from a slurry of said mineral wool and a wet adhesive during the forming operation which comprises subjecting one surface of said slurry to a suction and also subjecting the opposite surface thereof to light air pressure, said pressure being sufficiently light so that it does not appreciably collapse the fibrous framework about the interstices resulting from the removal of the excess liquid from said shaped slurry

MAX H. KLIEFOTH.